J. G. LUDWIG.
CASTER.
APPLICATION FILED MAY 14, 1912.
1,033,256.
Patented July 23, 1912.
2 SHEETS—SHEET 2.
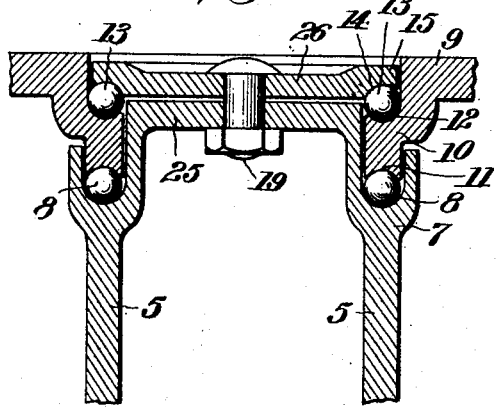
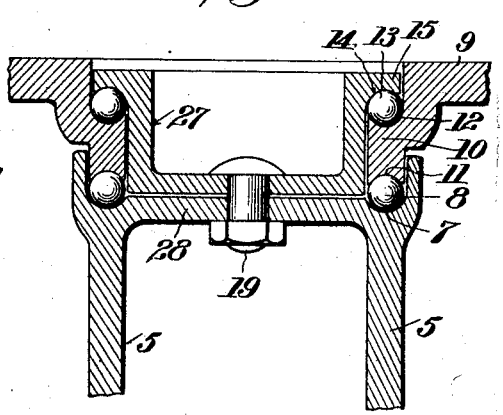
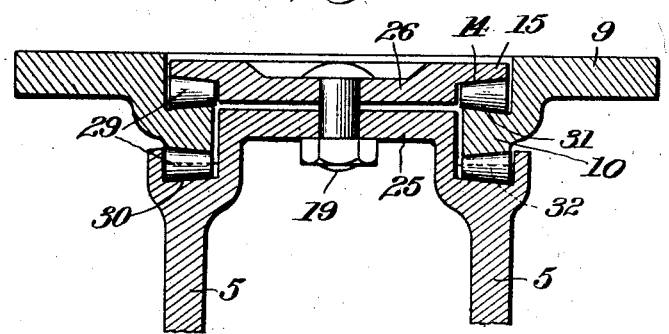
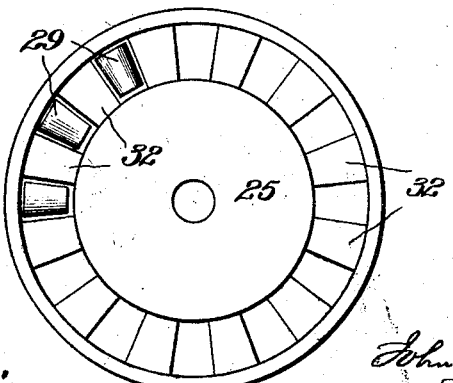
WITNESSES
INVENTOR
John G. Ludwig
by Attorney

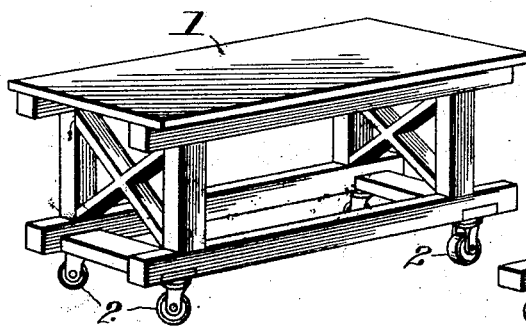
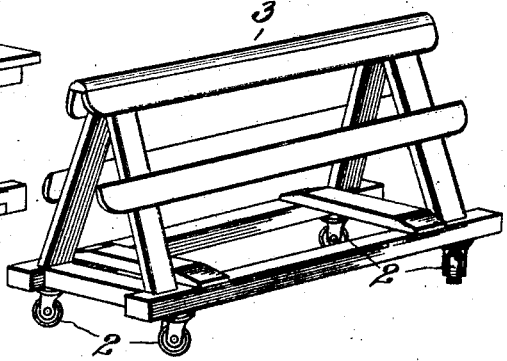
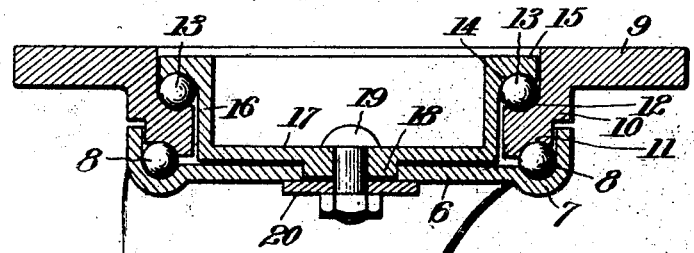

UNITED STATES PATENT OFFICE.

JOHN G. LUDWIG, OF MIDDLEVILLE, NEW YORK.

CASTER.

1,033,256. Specification of Letters Patent. Patented July 23, 1912.

Application filed May 14, 1912. Serial No. 697,238.

*To all whom it may concern:*

Be it known that I, JOHN G. LUDWIG, a citizen of the United States, residing at Middleville, in the county of Herkimer and State of New York, have invented a certain new and useful Improvement in Casters, of which the following is a full, clear, and exact description.

The object of this invention is to provide a ball-bearing caster, specially applicable to heavy articles or to articles designed to support heavy loads, of such character as to counteract the tendency of the parts of the bearing to gape and release the bearing balls. The invention, however, is applicable to casters for any use.

The invention consists of a caster having two tiers of ball-bearings arranged one above the other, the caster-attaching plate having a cup for one tier and a race for the other tier of balls, the complemental race and cup respectively being formed in a retaining plate or cap and the caster wheel bracket respectively, which I will proceed now more particularly to set forth and finally claim.

In the accompanying drawings illustrating the invention, in the several figures of which like parts are similarly designated, Figures 1 and 2 are perspective views of a truck and a horse, respectively, commonly used in tanneries and which are heavy in themselves, and also adapted to support rather heavy loads. Fig. 3 is an elevation of one of the casters, showing the ball-bearing in section. Figs. 4, 5, 6 and 7 are cross-sections of various forms of ball-bearings embodying the invention. Fig. 8 is a plan view of the construction shown in Fig. 7.

As illustrated in Figs. 3 to 6 inclusive, spheres are used in the ball-bearings, while in Figs. 7 and 8 rollers are used, and it is to be understood that by the term "ball-bearings" I mean to include the use of spheres and rollers as well. Furthermore, although I have illustrated various forms of ball-bearings of the type described, it is to be understood that I have not thereby attempted to exhaust the variations included within the scope of the invention.

The truck 1, Fig. 1, is of the table type, and it is supplied with four swiveling casters 2; and the horse 3, Fig. 2, is of ordinary type and it likewise has four similar casters 2. These two well-known articles are here shown merely for illustrative purposes.

Referring to Fig. 3, the caster wheel 4 is mounted to turn in a forked bracket 5, provided with a connecting cross-plate 6, the outer portion of which is made as a ball-cup 7 to receive the bearing balls 8. The plate 9 for attaching the caster to an article, has the depending flange 10 in the lower edge of which is made the ball-race 11, to coöperate with the cup 7 to retain the lower tier of balls 8 in place; and said flange is made with a ball-cup 12 in its upper edge to receive the balls 13 of the upper tier. The ball-race 14 for the upper tier of balls 13 is made in the flange 15 of a shell-like cup 16, the base 17 of which is arranged parallel with the cross-plate 6 of the wheel bracket, and has a hub 18 which fits in a hole in the said cross-plate. 19 is an axial bolt or rivet passing through the hub 18 and the cross-plate and secured by a nut and washer 20 or other means, so that the bracket may turn freely on the attaching plate 9.

In the modification shown in Fig. 4, substantially the same elements as those just described are present, except that the cross-plate 21 is made shell-like with a depressed socket 22, and the upper ball-race is made in a flat cap 23 having a hub 24 to fit and turn in the said socket.

The construction shown in Fig. 5 is substantially like that shown in Fig. 4, excepting that the socket and hub are omitted. That is to say, the cross-plate 25 is flat on top and the ball-race cap 26 is likewise flat.

The construction shown in Fig. 6 is substantially like that shown in Fig. 3, excepting that the shell-like upper ball-race cap 27 is made without a hub and the cross-plate 28 is without a hole other than one for the passage of the axial bolt or rivet.

In Figs. 7 and 8 is shown an adaptation of a ball-bearing like that shown in Fig. 5, to use rollers 29, here shown as tapering, and in order to keep these rollers properly spaced apart the cups 30 and 31 may be provided with blocks 32 to alternate with the rollers.

In the use of ball-bearing casters with only one tier of balls, it is found that unequally distributed strains or shifting strains, fall upon the axis and tend to cause the cup and race to gape, and as these parts are thus worn away the gap widens and the balls escape. By the several constructions shown, the upper tier of balls takes up these strains. Not only so, but the truck or horse is more easily turned and handled. In all of these constructions the cap by overlapping the flange serves to connect the attaching plate and the brackets.

It will be noted that the shell-like member is indifferently a part of the cap or a part of the bracket. In either case its vertical wall is parallel with the depending flange on the attaching plate and takes the lateral thrusts, while at the same time it is a sort of journal about which the bracket turns. The bolt or rivet 19 thus is relieved of some strain and its main function confined to fastening the bracket and its attaching plate together.

The casters may be made of any suitable metal, by casting, drop-forging, or other process suitable to such work.

Of course I do not limit my invention to its use upon any particular articles, or to size and proportions of parts. Nor do I limit it to the use of caster wheels, since substitutes for wheels as supports may be employed.

What I claim is:—

1. A caster, having a bracket and a support therein, said bracket having a ball-cup and balls therein, an attaching plate for securing the caster to an article, a depending flange on said plate having a ball-race coöperating with said ball-cup to retain the balls therein and having above said race a ball cup in which is a second tier of balls, a cap having a ball-race coöperating with the cup in the upper part of said flange to retain the balls therein, said cap also serving to connect the attaching plate and bracket, and means to connect the cap and bracket.

2. A caster, having an attaching plate provided with a depending flange having a ball race on its lower edge and a ball cup on its upper edge, a caster bracket having a ball cup and balls therein next to the race in the depending flange, balls arranged in the upper cup, a shell-like member arranged between the bracket and the attaching plate, and means to connect the bracket and attaching plate so as to retain the balls in their cups.

In testimony whereof I have hereunto set my hand this 10th day of May A. D. 1912.

JOHN G. LUDWIG.

Witnesses:
HAROLD G. BURRILL,
GEO. T. LEWIS.